United States Patent
Parthasarathy

(10) Patent No.: US 6,826,182 B1
(45) Date of Patent: Nov. 30, 2004

(54) AND-OR MULTI-CAST MESSAGE ROUTING METHOD FOR HIGH PERFORMANCE FAULT-TOLERANT MESSAGE REPLICATION

(75) Inventor: Guturu Parthasarathy, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/457,855

(22) Filed: Dec. 10, 1999

(51) Int. Cl.[7] .......................... H04L 12/28; H04L 12/56
(52) U.S. Cl. ...................... 370/390; 370/400; 370/432
(58) Field of Search ................................ 370/400, 254, 370/390, 432, 412, 428, 429, 351, 389, 338, 349

(56) References Cited

U.S. PATENT DOCUMENTS

| | | | |
|---|---|---|---|
| 5,612,959 A | * 3/1997 | Takase et al. ................ | 370/390 |
| 5,617,422 A | * 4/1997 | Litzenberger et al. ....... | 370/401 |
| 5,831,975 A | 11/1998 | Chen et al. .................. | 370/256 |
| 5,920,570 A | 7/1999 | Gebhardt ..................... | 370/429 |
| 6,091,720 A | * 7/2000 | Bedard et al. ............... | 370/351 |
| 6,122,630 A | * 9/2000 | Strickler et al. ................ | 707/8 |
| 6,137,806 A | * 10/2000 | Martinez ..................... | 370/428 |
| 6,147,992 A | * 11/2000 | Giroir et al. ................ | 370/390 |
| 6,201,792 B1 | * 3/2001 | Lahat .......................... | 370/236 |
| 6,246,680 B1 | * 6/2001 | Muller et al. ................ | 370/389 |
| 6,259,673 B1 | * 7/2001 | Yoshihara et al. ........... | 370/238 |
| 6,307,861 B1 | * 10/2001 | Hogg et al. .................. | 370/432 |
| 6,320,861 B1 | * 11/2001 | Adam et al. ............. | 370/395.7 |
| 6,421,338 B1 | * 7/2002 | Byers et al. ................. | 370/352 |

\* cited by examiner

Primary Examiner—Ajit Patel
Assistant Examiner—Chirag Shah

(57) ABSTRACT

A high performance fault tolerant AND-OR multi-cast message routing for asynchronous message replication in Advanced Intelligent Network (AIN) applications is provided. Service control points (SCPs) distributed over multiple LAN sites, are configured to propagate their share of the network side updates (NSUs) to their peer nodes, in order to synchronize databases at all locations across the network. Using an AND-routing, the messages are despatched from a primary replication node to all peer nodes at the same LAN site, and to only one transit node at each other LAN site, such that the transit node becomes a secondary source of replication. Fault tolerance is addressed by assigning to another node located at the same LAN site with the replication node (primary or secondary) the responsibility to act as a surrogate replicator. Using an OR-routing, the primary source node may propagate the messages either to the transit node, or to the surrogate node, whichever is alive. Each time inactivity of a node is sensed, the active replicator dynamically switches connection from the failed node to the surrogate node. Because all the replication nodes, primary, secondary or their surrogates, are responsible to despatch the messages to all their peer nodes located at the same LAN site, the WAN traffic is significantly reduced.

30 Claims, 7 Drawing Sheets

AND-OR MULTI-CAST MESSAGE ROUTING METHOD FOR HIGH PERFORMANCE FAULT-TOLERANT MESSAGE REPLICATION

BACKGROUND OF THE INVENTION

1. Field of the Invention

The present invention relates to the field of computer networking, and more specifically to an AND-OR multi-cast message routing method for high performance fault-tolerant message replication.

2. Related Art

In many high availability distributed service environments, it is required to maintain multiple synchronized databases with nodes spread over multiple local area network (LAN) sites connected to a Wide Area Network (WAN). High performance requirements mandate that these databases synchronize in real-time continually with new update messages originating at any node in the configuration.

Some terms are defined hereunder along with FIGS. 1–4 for a better understanding of the invention.

FIG. 1 illustrates a typical multi-site nodal architecture. In this example, LANs 11, 12, 13, are connected to a WAN 16. Each LAN 11, 12, 13, is housing Service Control Points (SCPs) and corresponding databases (DB). The SCPs receive updates from an SS7 network 17 and are further required to replicate their share of SS7 Network Side Updates (NSUs), and propagate the updates to all their peer nodes for commitment to their respective databases for an automatic synchronization.

In the configuration of FIG. 1, all the SCPs have access to their own copies of service databases for query processing and updating. Each SCP communicates the received updates to other SCPs so that they may commit the updates to the respective databases. The databases thus get up-to-date, as well as synchronized on the service information.

The message replication process implies that each message is copied and transmitted to all other destinations. It can be implemented using—synchronous or asynchronous algorithms. The goal of the synchronous class of algorithms is message-by-message synchronization, whereby a message is transmitted only after the previously propagated message is confirmed to have been successfully committed at all the destinations. In addition, a message has to be committed either everywhere or nowhere, and if the message cannot be committed at one SCP, the transaction is rolled back and all the databases are restored to the previous state. Obviously the synchronous algorithms are limited by the speed of the slowest SCP.

Another disadvantage of this class of algorithms is that, occasionally, an SCP may fail and may hold up the entire replication process until it is revived. In order to guarantee that the updates are carried out atomically, i.e. done everywhere or nowhere, exchange of a large number of protocol messages among SCPs is required and this adversely impacts the network bandwidth utilization.

FIG. 2 illustrates an example of asynchronous message replication viewed as a process of identical message streams 26, 27, 28, propagating from a source to different destinations 21, 22, 23, at different paces, depending upon the individual destination. The messages are propagated continuously to the peer-SCPs which in turn commit these messages to their respective databases for eventual synchronization of the databases.

Asynchronous algorithms on the other hand, do not guarantee dynamic convergence of the databases, but offer speed and effective network bandwidth utilization, with eventual convergence of the databases. Further, since the time order of origination of the NSUs coming from different sources need not to match the order of their receipt at the destination ends, asynchronous algorithms have to implement a database updating strategy which ensures database synchronization despite the differences in the order in which updates from different streams arrive at individual destination nodes. This update strategy should also involve a method of detecting conflicting updates originating at the same time, or almost at the same time at different SCPs, assuming the clocks of all SCPs are synchronized using a Global Positioning System. Such strategies are available and hence it is possible to implement an asynchronous replication algorithm and take advantage of the high performance it provides. However, it is possible to improve this performance with respect to network bandwidth utilization by effective propagation of message streams.

A solution to the message replication problem is to replicate all the messages received by a SCP and to send them to all the SCPs in the network. The messages generated at any source node are placed into a number of message streams equal to the number of destinations and propagated to their destinations. This implies that the WAN traffic increases five times for the topology with five nodes per LAN site presented in FIG. 1, since a message generated at one node at a LAN site 11 flows five times on each WAN connection. This is definitely a colossal wastage of WAN bandwidth because the same message has to be propagated over a WAN 16 a number of times equal to the number of the other SCPs at all the other LAN sites 12, 13.

Some of the problems associated with such a distribution are listed below. In the usual configuration where a number of SCPs are housed on a few LAN sites interconnected by a WAN, known multi-cast routing methods generate WAN peak traffic proportionate to the number of the SCPs in the network. This could lead to network congestion during traffic periods, because of the relatively low bandwidth of the WANs (compared to the LANs).

To build a fault tolerant process upon the above described framework it would be extremely difficult because if a SCP fails, the replication process stops. Moreover, the complexity of the protocols needed to assess the best SCP to be contacted by a failed node at the time of recovery provides for extensive delay.

Finally, the presently known commercial products use synchronous replication methods like the 2-phase or the 3-phase protocols and this implies extensive protocol message traffic and propagation latency.

Therefore, there is a need for an improved asynchronous replication process for a multi-cast messaging framework.

SUMMARY OF THE INVENTION

It is an object of the present invention to provide an asynchronous multi-casting method which alleviates totally or in part the drawbacks of the prior art methods.

Another objective of the present invention is to minimize WAN traffic by allowing a message to flow across a WAN connection at most once during normal, failure-free operation mode.

According to one aspect of the present invention, a multi-cast routing method for asynchronous propagation for messages from any source location to its pre-configured replication nodes in an advanced intelligent network (AIN), is provided. The method comprises the steps of establishing connections between a primary replication node located at a first LAN site and all its peer nodes at same LAN site, creating a transit node located at a second LAN site, and establishing a connection between the primary replication node and the transit node (AND-routing). The transit node becomes a secondary source of replication at the second LAN site. Finally, connections are established between the transit node and all its peer nodes located at the second LAN site.

According to another aspect of the invention, a fault tolerant replication method without any degradation of the WAN bandwidth efficiency, is provided. A surrogate node is created for each replication node so as to form complementary replication nodes at each LAN site. Using an OR-routing, the messages from an active replicator can be directed either to the replication node, or to its surrogate node, whichever is live.

The message streams between replication nodes are established by implementing identical multi-cast queues for each replication node. A multi-cast queue may have a plurality of source sublocations configured at the input end, and a plurality of destination sublocations configured at the output end for routing messages between the replication nodes and the destination nodes that receive the message. The destination nodes contain identical databases as the replication nodes, and use the update messages to synchronize their respective databases with those of the replication nodes. The availability of multiple redundant synchronized databases facilitates implementation of the query load sharing algorithms, and provides for improved fault tolerance, including catastrophe tolerance.

The invention provides an efficient and robust distribution method of services, and allows to maintain a reliable single common view of a user's data, across multiple databases, without excessive delays or computational overhead. For example, it may be used for updating the Prepaid-card customer's account balance throughout a network.

An effective utilization of WAN bandwidth is achieved according to the present method at the expense of LAN bandwidth, as the WAN traffic is limited to the size of the message stream, and the total number of LAN sites. Only one connection among the primary and secondary sources of replication is active at one time and therefore, WAN traffic does not increase. Since the WAN traffic is a node limited resource compared to LAN bandwidth, this aspect of the invention is considered to be very advantageously for message replication.

Furthermore, the asynchronous message replication method according to the invention provides better propagation latency and relatively negligible protocol message traffic. WAN traffic reduction is obtained through a process of effective propagation of a stream of messages to all nodes in the network. The relay process involving message replication from primary to secondary sources of replication (AND-routing), and then from secondary sources to the end destinations, distributes the computational burden for multi-casting over a number of nodes since the originating source node need not replicate directly to all the nodes in the network.

Another advantage of this invention is that failures are localized at LAN sites since a reviving node does not need to get the backlog messages across the WAN from the primary source, and can procure them from the secondary source established at the same LAN site.

In addition, this method provides an efficient solution for sensing the death/revival of a node and allows dynamically switching the connection (through OR-routing) of the main replicator with the failed transit node to the surrogate node, and vice-versa.

The method of the present invention is user configurable and allows for deleting nodes, or adding new nodes/sites and bringing them into the replication framework.

BRIEF DESCRIPTION OF THE DRAWINGS

The invention will be now explained by way of example only, and with reference to the following drawings, where.

Similar references are used in different figures to denote similar components.

DESCRIPTION OF THE PREFERRED EMBODIMENTS

High performance requirements mandate that redundant databases in a private network synchronize in real-time continually, with new update messages originating at any node of the network. The NSUs messages generated by the SS7 network 17 and containing the information for updating the individual records of a database are distributed by the SS7 network 17 among live SCPs in accordance with a standard policy like round-robin, or a priority distribution. Each SCP, in turn, is required to transmit its share of NSUs, in sequential order and without any loss, to all its peer nodes in the network.

Figure 1:
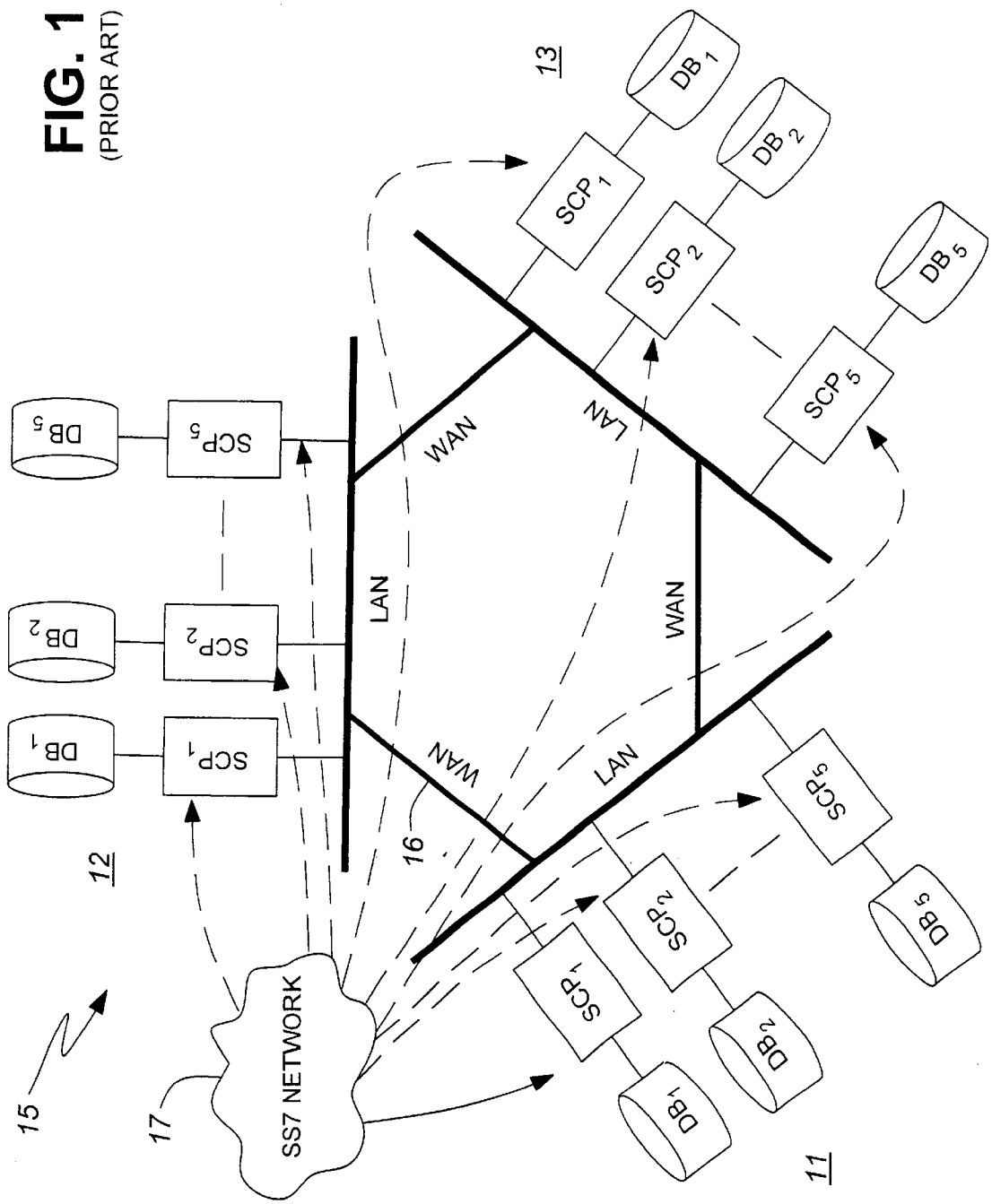
FIG. 1 illustrates a conventional multi-site nodal architecture for message replication and database synchronization.
Figure 2:
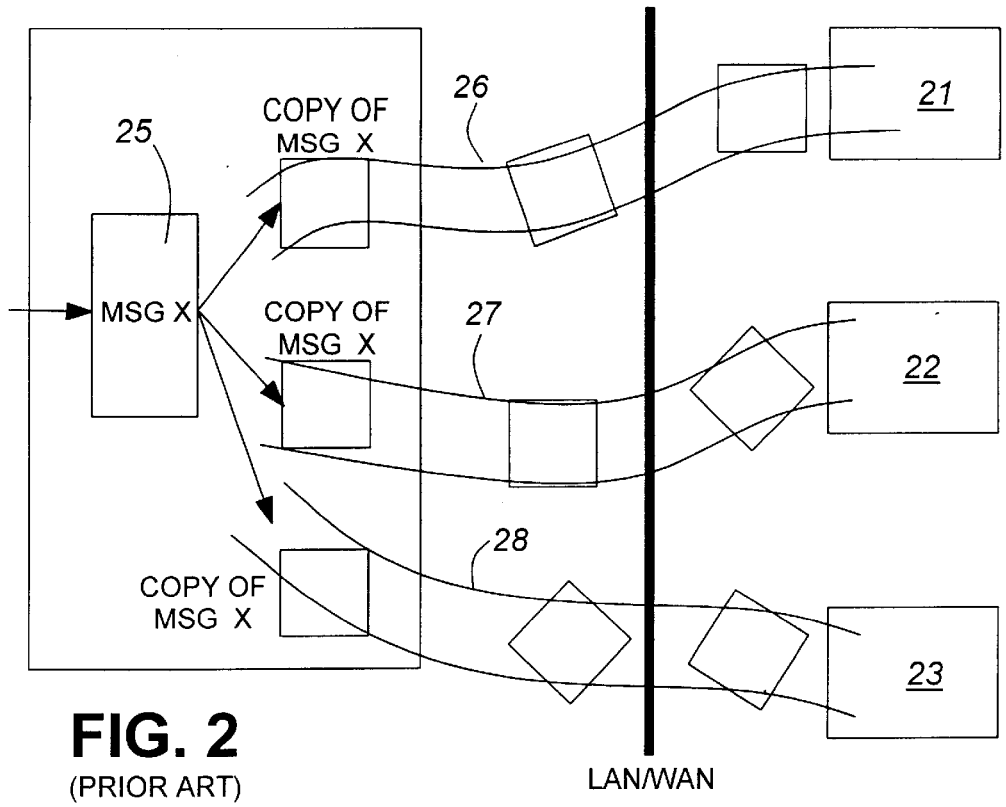
FIG. 2 illustrates a conventional asynchronous message replication.
Figure 3A:
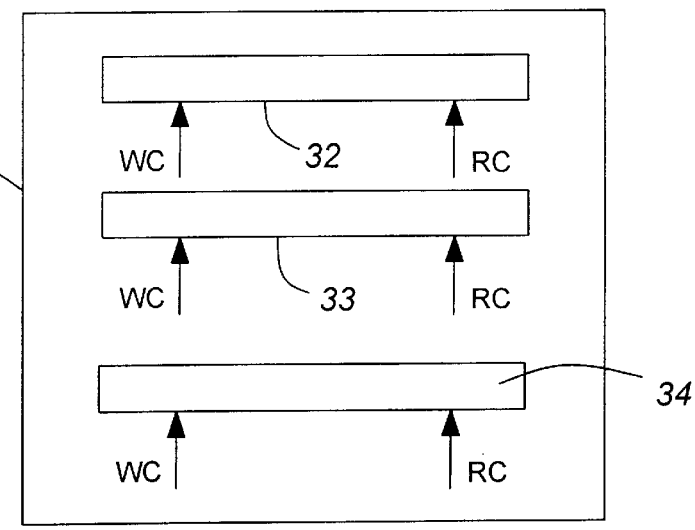
FIG. 3a illustrates a composite multi-cast queue formed by a plurality of identical queues.

An uninterrupted flow, of identical stream of messages sent to multiple destinations is desirable for an asynchronous mode of message replication. A message stream is implemented as a message queue having a write-cursor (WC) and a read-cursor (RC), as shown in FIG. 3a.

Figure 3B:
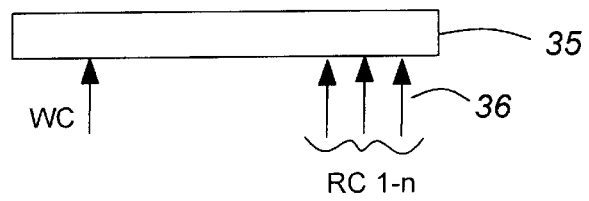
FIG. 3b illustrates a composite queue formed by a single queue having multiple read cursors.

Identical messages flowing from the source node to the destination nodes can be separated either physically or logically. This means that replication message queues can be implemented either as a composite queue 31 containing individual queues 32–34 corresponding to each message flow, or as a single queue 35 with a number of read cursors 36 tagged to different destinations. FIG. 3a illustrates a composite multi-cast queue 31 formed by a plurality of identical queues 32–34. FIG. 3b illustrates a single composite queue 35 with a single write cursor WC and multiple read cursors (RC1–n) 36. Obviously, the later is a better choice for real-time systems, since the message copying overhead is reduced by a factor equal to the number of destinations. Since the pace of flow could vary from destination to destination, and depending upon the rate of consumption of messages by a destination, the individual read-cursors may either move fast or slow.

In order to prevent message loss, the queue should be persistent at least to the extent that the messages cannot be lost before all the destinations confirm their successful application to their respective databases.

To ensure speed along with persistence, the queues may be designed in a number of ways, e.g. using a nonvolatile random access memory (RAM), or using shared memory and disk space in such a way as to optimize speed, or using shared memory and a network file server (NFS).

An important feature of queues 31, 35, is that these queues are made entirely accessible to other nodes in the event of failure of the primary node. This is provided either by making one or more surrogate nodes build identical queues, or by choosing to use a nonvolatile RAM, or NFS, for building queues equally accessible to both the primary nodes and the surrogate nodes.

Design of queues for asynchronous replication is a separate topic by itself and it does not come under the scope of this invention. Nonetheless, the design approach should not matter as long as the requirements specified above are met and there is a mechanism in place to tag each read cursor (RC1–n) 36 of the queue 35 to a particular destination. The composite queue 31, as well as the multiple read cursors queue 35, allows the user to configure the destination of individual replication queues and to create a replica queue for every single queue, as desired.

Figure 4A:
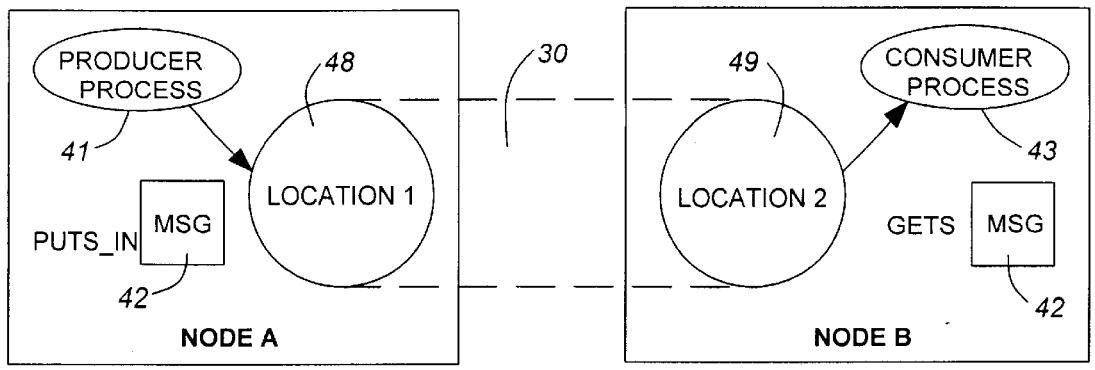
FIG. 4a is a conceptual view of an asynchronous point-to-point message communication between two remote processes on two different nodes.
Figure 4B:
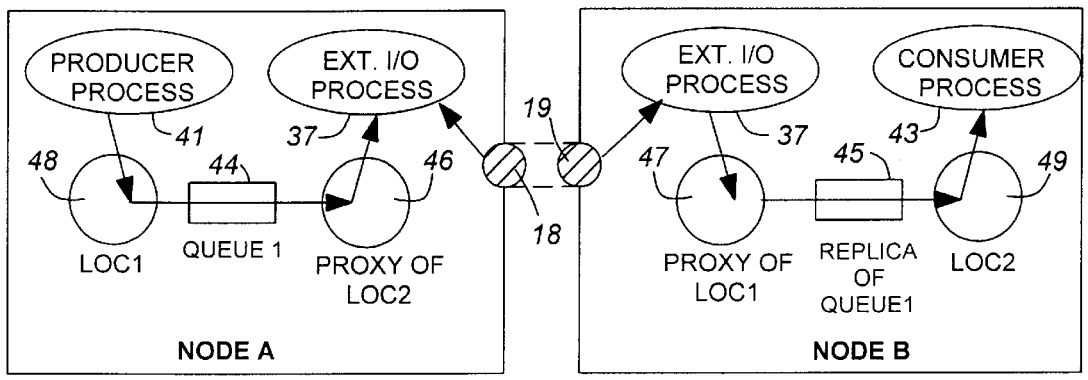
FIG. 4b illustrates a producer-consumer communication process between the two remote processes of FIG. 4a implemented with proxies of physical locations and replica queues.
Figure 4C:
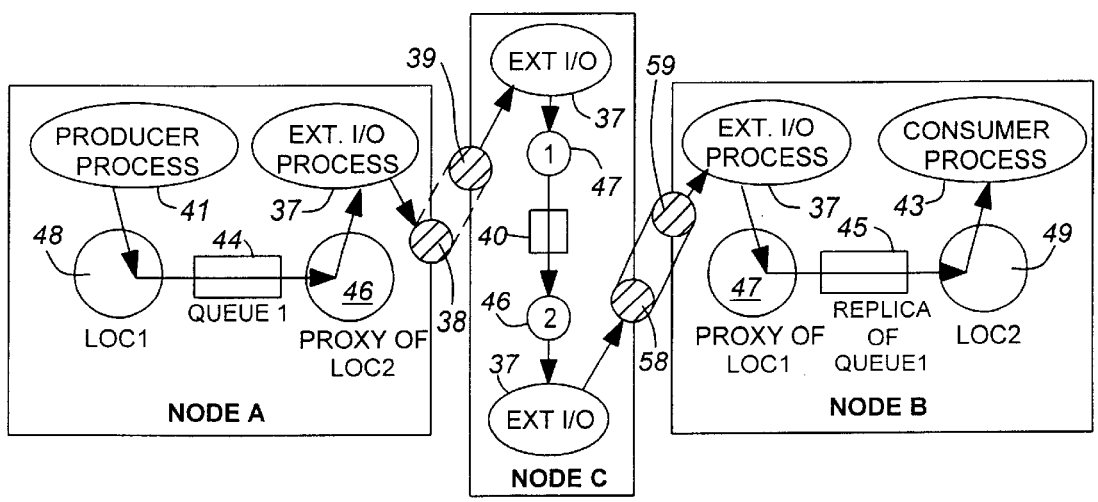
FIG. 4c illustrates the producer-consumer communication process of FIG. 4b implemented with a transit node.

The basics of a point-to-point messaging framework are depicted in FIGS. 4a, 4b, 4c. FIG. 4a is a conceptual view of an asynchronous point-to-point message communication between a producer process 41 and a remote consumer process 43 which are located on two different Nodes A and B, respectively. Messages 42 are placed at a first physical location 48 of node A by the producer process 41 and transmitted to a second physical location 49 at node B via a message channel 30. At node B the consumer process 43 gets the messages 42 from location 49.

Since the stream of messages flows from location 48 to location 49, these locations can be considered to be either end-points of an inter-process communication, or queues, and the messages 42 are immediately consumed one by one, by a process which despatches the messages 42 to their intended destination at node B.

FIG. 4b is a representation of a producer-consumer communication process between the two remote processes 41 and 43 of FIG. 4a, using locations 48 and 49, queue 44 and its replica, queue 45. Proxy locations 46, 47, are created for location-2 49 at node A and for location-1 48 at node B, respectively. Proxy locations 46, 47, are images of the physical locations 48 and 49 in the other node.

For communication of messages between nodes A and B, the peer external input/output (I/O) processes 37 on nodes A and B creates sockets 18 at node A and 19 at node B. Messages arriving at the proxy location 46 are consumed by external I/O process 37 on node A and despatched via socket 18 to node B The peer external I/O process 37 on node B writes the messages received via socket 19 to the proxy location 47 for placement into queue 45 and transfer to the physical location 49. The consumer process 43 picks up the messages from location 49 and either applies them to the local database, or sends them to another remote site (not shown), so that they are similarly passed through the respective queues and handed over to the ultimate consumer process (not shown).

As seen above, the messages routed from the one location to another location via these queues. The queues are configured to operate between a source and a destination. The routing is determined by the mapping obtained from a pre-configured routing table which determines the identification of the proper queue, based on the message origination and destination location identification provided in the messages.

The location objects 48, 49 have a number of attributes such as a service tag, a host identification, a port number, and various flags and thresholds which determine the conditions for opening/closing of locations. Locations can be either local, i.e on the same node, or remote, on another node. The locations are controlled by different processes located either at the input-end or at the output-end of a queue. For example, the producer process 41 at node A which receives update messages (NSUs) from the SS7 system, may consult a pre-configured routing table containing triplets (the location identifications of the message origin and destination, as well as the queue identification) in order to determine the proper queue through which messages 42 are to be propagated to the consumer process 43. Thus, this process 41 indirectly controls the configuration of locations at the input-end of each queue 44, 45.

The locations at the output end of queues 44, 45 are compound locations containing sublocations corresponding to different destination ends and therefore, these queues are called multi-cast queues. Message routing via a queue having a compound location as its output-end is called "AND-routing" as the message is propagated to all the constituents of this AND locations, though not necessarily at the same time. Thus, by using an AND-routing each message in the multi-cast queue 44, 45, is propagated to all the configured destinations.

FIG. 4c is a representation of a producer-consumer communication process implemented with a transit node C. If there is no direct path between the two nodes A and B, messages are communicated from node A to node B via transit queue/s 40 located on one or more transit nodes C. The processes 37 at nodes A, B, and C, are responsible for I/O of the messages to/from proxy locations 46, 47, and for creating the sockets 38, 39, and 58, 59, according to the respective transport protocol like VDL or TCP. In the case of the IP protocol, processes 37 will use the IP addresses (derived from the remote host ID in the standard transport layer) to maintain both the socket descriptors and the message buffers required for communication with external nodes.

A plurality of transit queues 40 may be configured between proxy locations 46, 47, and housed on different transit nodes C configured at each LAN site, for the purpose of relaying the messages from the source node A to other nodes at the same site as that of the node C.

Figure 5A:
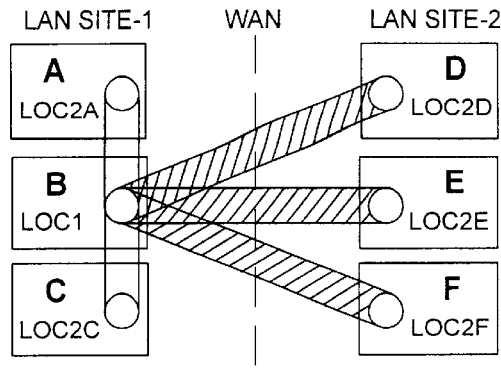
FIG. 5a illustrates an example of WAN connection of LAN locations for an asynchronous multi-casting AND-routing.
Figure 5B:
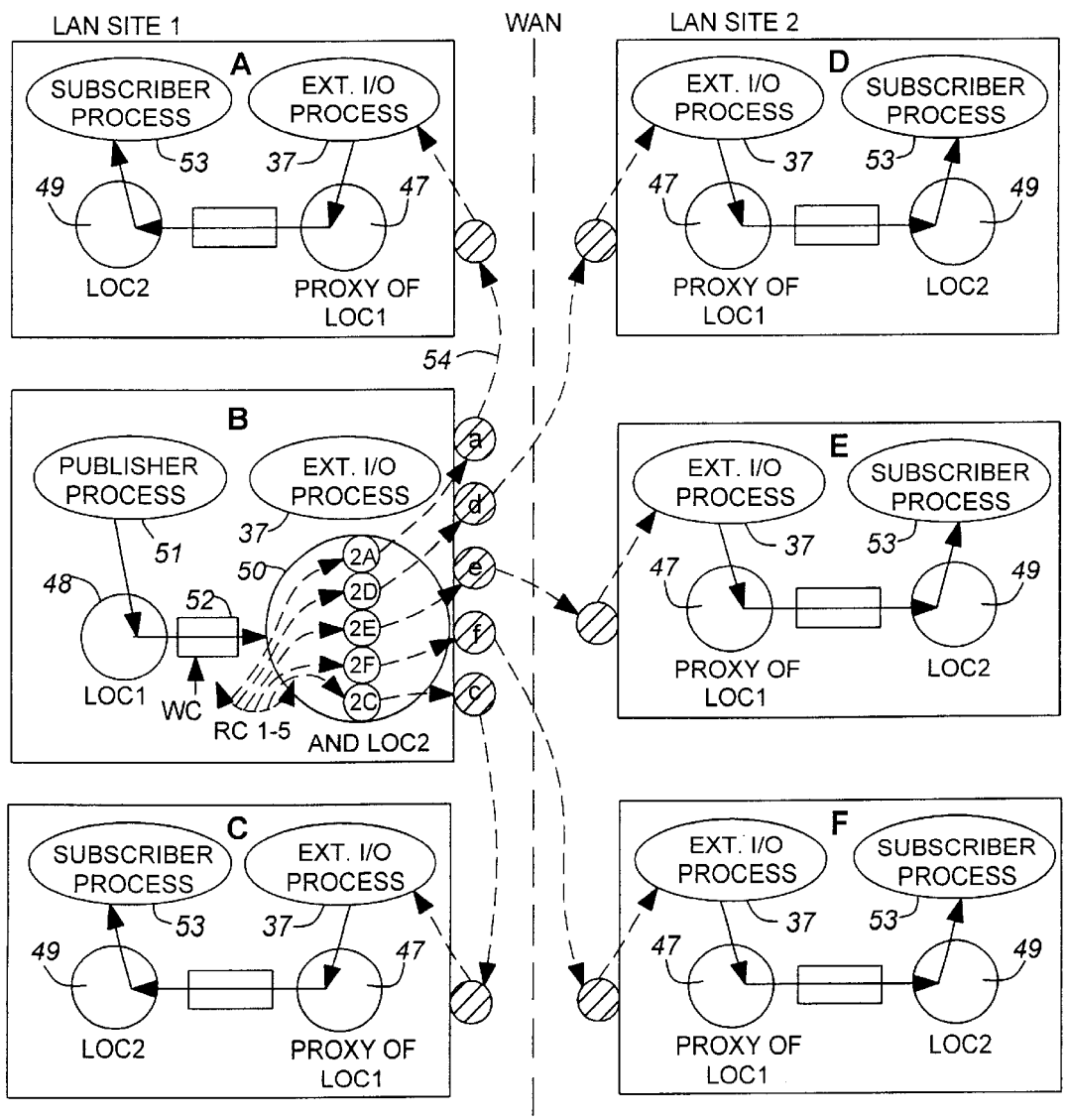
FIG. 5b illustrates a publisher-subscriber communication process using the non-optimal WAN connections of FIG. 5a, as well as queue implementation and location configuration.

FIGS. 5a and 5b show the connections and configuration of locations for a single source AND-routing for a publisher-subscriber communication process using the asynchronous multi-casting message replication method.

A two site configuration as shown in FIGS. 5a and 5b includes nodes A, B and C at a first LAN site, and nodes D, E and F at a second LAN site. In this example, node B is the primary source of replication. In a conventional process, messages from node B are sent directly to all the nodes A, C, D, E and F as shown in FIG. 5a. It is evident that usage of WAN bandwidth is not optimal, since three identical WAN connections are provided for passing the same message streams between LAN site 1 and LAN site 2.

FIG. 5b shows an asynchronous multi-cast messaging from a single source, implemented with the multi-cast queue 52 and the "AND location" 50 (internally designated as Location-2). The publisher 51 writes the messages to location 48 (internally designated as Location-1) and subscriber processes 53 consume the messages from their ultimate destination locations 49 (internally designated as Location-2) at nodes A, C, D, E and F. According to the method a multi-cast queue 52 is created at node B, since an identical stream of messages flows from location-1 48 to the other locations.

Compound location-2 50 is configured in this example with five destination sublocations, which are the proxy locations 2A, 2C, 2D, 2E, 2F, where 2 indicates location 2 and the letter indicates the node. The compound location-2 50 may be termed as an "AND-location" because messages read from this location go to destination sublocations 2A, 2C, 2D, 2E, and 2F, though not necessarily at the same time. Sockets a, c, d, e, f, corresponding to each remote location-2 49 are also created at node B.

The multi-cast queue 52 between source location-1 48 and the compound location-2 50 may be designed as a single queue with multiple read cursors RC1–5, or as a composite queue containing identical sub-queues each sub-queue catering to a destination sublocation configured at the output end of the compound location-2 50. As discussed in connection with FIGS. 3a, 3b, the first method is more effective because each message need not be copied into different sub-queues. The method of designing of the multi-cast queue 52 is not important since both the single and the multiple read-cursor queue can be considered as a composite multi-read cursor queue 35 (see FIG. 3b).

At the time of configuration of the both multi-cast queue 52 and the compound location 50, each read cursor RC1–5 of the composite multi-read cursor queue 52 should be tied up with an individual destination sublocation of the compound location 50. This permits the external I/O process 37 to read the messages one by one from each read cursor RC1–5 positions and to send them into pre-configured sublocations-2 at nodes A, C, D, E, and F. The destination locations-2 47 at nodes A, C, D, E, and F correspond to the proxy destination sublocations 2A, 2C, 2D, 2E, 2F.

A message written to sublocation 2A will be sent to location-2 49 at node A via the communication channel 54. Therefore, the read cursor positions, as well as the speed with which messages are sent to the locations-2 at different host nodes could vary depending upon the communication link protocol between node B and its peer and host nodes.

Figure 6A:
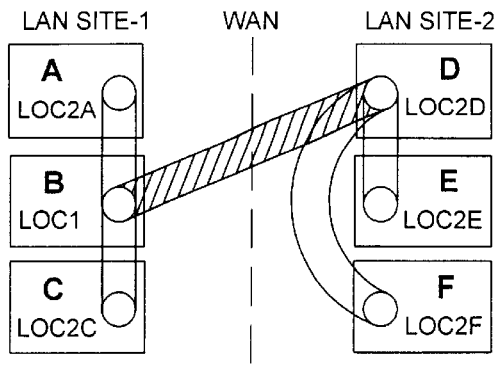
FIG. 6a illustrates an optimal WAN connection of locations for a WAN bandwidth-efficient AND-routing.
Figure 6B:
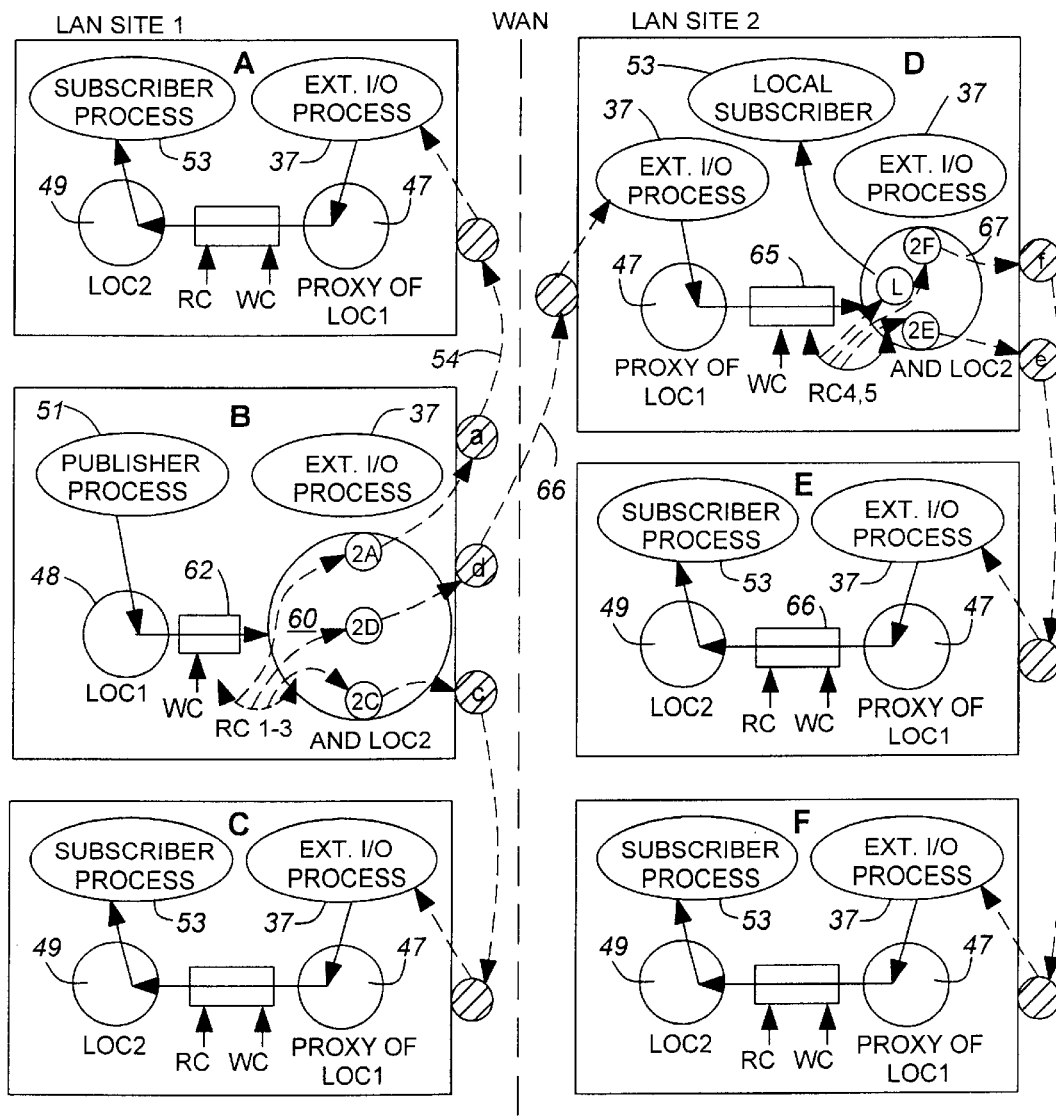
FIG. 6b illustrates a publisher-subscriber process using the optimal connections of FIG. 6a, as well as the queue implementations and location configurations.

FIGS. 6a and 6b depict direct and indirect connections required for an AND-routing which is optimal with respect to WAN bandwidth utilization. The messages may be sent directly to other nodes A and C on the same LAN at site 1 and only to node D at site 2. They are however sent indirectly to all the nodes. Node D receives direct communication from the primary source replication node B and relays the messages to nodes E and F, as shown in FIG. 6a. Direct connections between the source of replication, node B, and its site peers A and C at site 1 and the off-site node D at site 2 are provided for replicating messages despatched from the publisher 51 at node B. They eventually go to all the subscribers 53 at nodes A, C, D, E and F.

Node D becomes a transit node having a direct connection 66 with node B. For propagating the messages to all the nodes in the network, transit node D should be configured to execute AND-routing to its site 2 peers and therefore, to become a secondary source of replication.

As shown in FIG. 6b, the configuration for nodes A, C, E and F would be almost similar to the one in the earlier example of FIG. 5b. However, nodes B and D are configured differently. The compound location 60 in Node B has only three destination sublocations 2A, 2C, 2D, compared to five destination sublocations in FIG. 5b. As in the previous example, sublocations 2A, 2C and 2D are proxies 47 of the destination location-2 48 in nodes A, C and D. Accordingly, the multi-cast master queue 62 in node B has only three read cursors RC1–3 corresponding to the pre-configured destination sublocations 2A, 2C, 2D. The external I/O process 37 will now read messages from three different read cursor positions RC1–3 and despatch them to physical locations-2 49 at remote host nodes A, C, and D, respectively.

The configuration of node D is similar to that of node B except for location-2 67 which is configured as an "AND location" at the output end of a multi-cast queue 65. The messages in queue 65 having read cursors RC 5,6 are to be communicated to the local subscriber 53, as well as to subscribers 53 in site peer nodes E and F. Therefore, the AND location 67 is configured to contain the destination sublocations corresponding to the local subscriber denoted with L, and the remote locations 2E and 2F in nodes E and F, respectively. As discussed before, node B is used to transmit directly to its LAN site peers, and to node D on the other LAN site, while delegating to node D the responsibility of replicating the messages to its LAN site peer nodes E and F using sockets e and f.

Each secondary source of replication at any other site, has a transit queue 65 identically configured as the master queue 62 for AND-routing of messages to its site peers. In the example of FIG. 6b, the transit queue 65 configured in node D is acting as a secondary source of replication, and communicates the messages to its peer nodes using the AND-routing.

Figure 7:
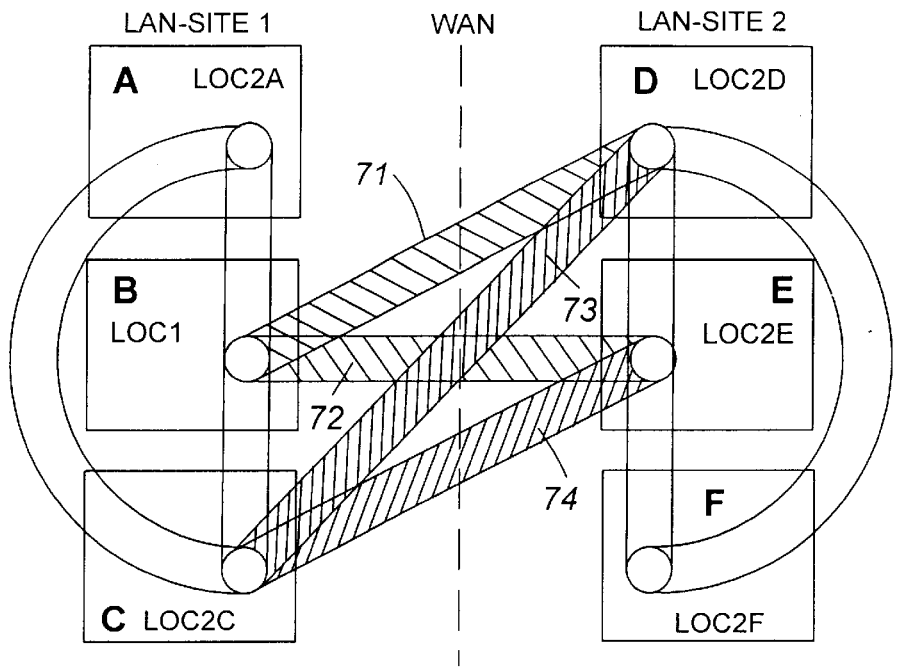
FIG. 7 illustrates a set of possible connections involved in an AND-OR routing with only one active connection across the WAN at any time.

FIG. 7 illustrates a set of possible connections involved in an AND-OR routing comprising six nodes A through F organized in a 2-site configuration with nodes B and D having their respective site peer nodes C and E as surrogate nodes. Surrogate nodes C and E take up the responsibility of relaying messages to the same destination nodes as that of the primary nodes B or D, when the later fails. The configuration of surrogates for different nodes may be done according to an algorithm, for example the next node in the order of node enumeration on the same LAN site. The method can be extended by creating more than one surrogate node and in case of failure, the highest ranked surviving surrogate node can be made to take over. In the above example, not all connections between LAN sites need to be active at one time. Only one of the four WAN connections 71–74 has to be active at any time.

For an efficient operation of the AND-OR-routing method, the activity of the nodes located on the same LAN site as for example the transit queues 89, 83, has to be monitored. Each surrogate node C, E, has the capability to monitor the health of its companion nodes, main or surrogate, by means of heart-beat, or KeepAlive messages. In this way, when a main transit node fails, one of the surrogates is always available to take the responsibility of the main source, primary or secondary. For example, if the main transit node D dies or is reviving, the primary source of replication node B may switch its connection from the main transit node D at LAN site 2 to the surrogate transit node E at the same LAN site, or vice versa. The surrogate transit node E now in charge, sends a feedback message to the primary replication node, either node B or its surrogate node C whichever is alive, to start routing messages to node E which is now responsible for the replication process. This provides seamless propagation of the message streams across the network.

Figure 8:
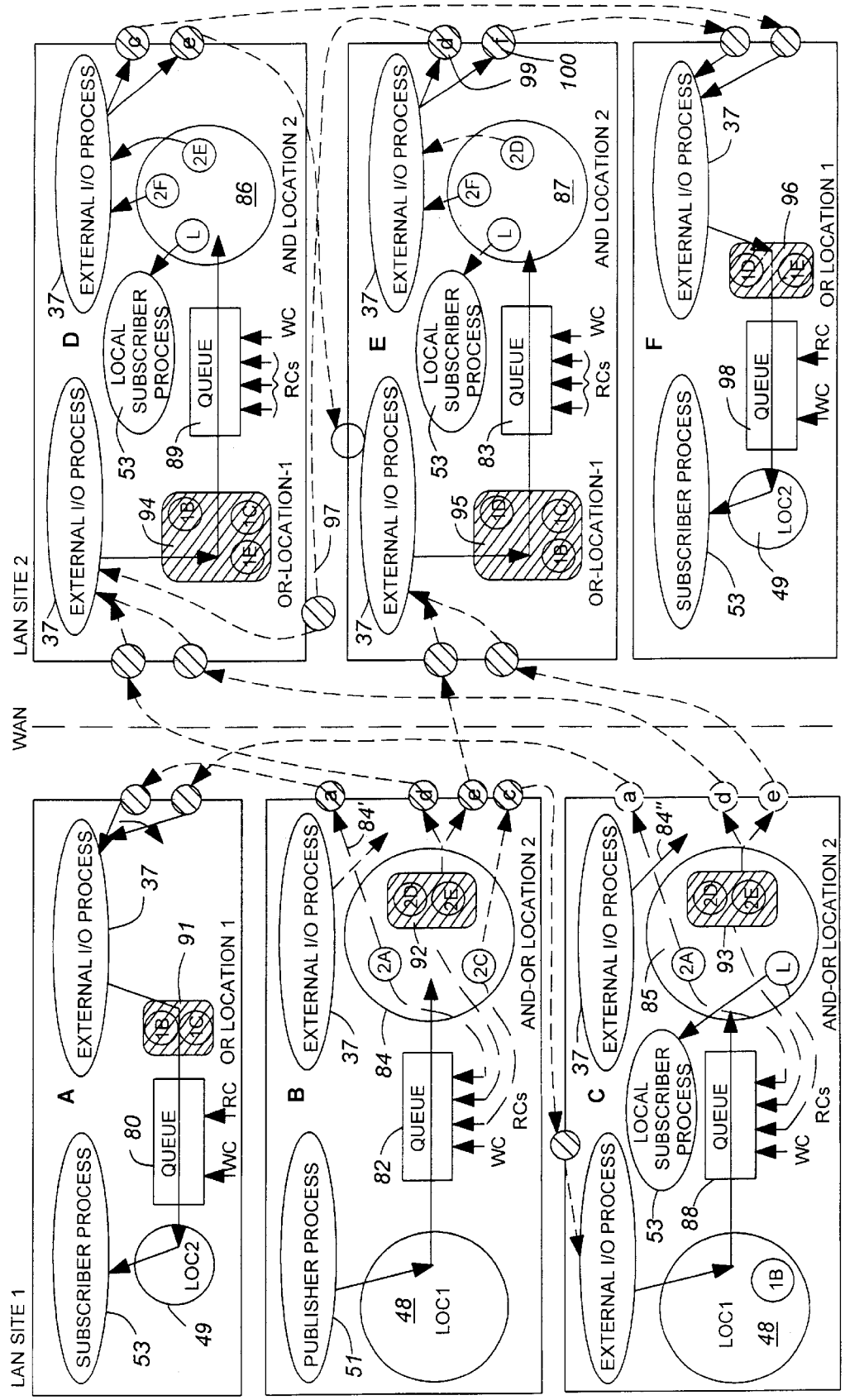
FIG. 8 illustrates a configuration of two remote LAN locations for a single source asynchronous multi-cast AND-OR message routing.

FIG. 8 illustrates the configuration for nodes A, B and C at LAN site 1, and the configuration for nodes D, E and F at LAN site 2, for performing a single source (node B) AND-OR multi-cast message routing method. As in FIGS. 6a and 6b, node B is the primary source of replication and node D is the main transit node. Nodes C and E are surrogates of nodes B and D, respectively. In this example, node B can send messages directly to nodes A and C on the same LAN at site 1, and to nodes D or E (E is the surrogate of node D) on LAN at site 2.

Switching the message flow from the main transit node D to the surrogate transit node E is achieved by providing a configuration including an AND-OR location 84, which includes in addition to constituents 2A and 2C described in connection with FIG. 6b, an OR location 92. OR location 92 is also a compound location generally comprising the destination sublocations of a main transit node and its surrogate, (here D and E), but with the property that only one of its sublocations is active at one time. To summarize, the AND-OR location 84 includes now the OR location 92.

Node C, which is the surrogate of node B, is configured in a similar way to include an AND-OR location 85 with the respective OR location 93. Node A will now receive messages from node B or from its surrogate node C, whichever is operational, or alive. Therefore, node A must also have an OR location shown at 91 at the input of the queue.

Queues 80, 82, 88, 89, 83, 98, at the respective locations A to F, are configured such that the messages written to the first location 48 in B by publisher 51, are transmitted to sublocations 2A and 2C at LAN site 1, as well as to either sublocation 2D or 2E at LAN site 2, whichever is alive, or the default choice if both are active. Thus, the multi-cast master queue 82 is configured to deliver messages from source location-1 48 to the destination ends configured in the AND-OR location 84 having 2A AND 2C, and (2D OR 2E) as constituents. Queue 89 is a secondary or main transit queue with respect to the master queue 82, while queues 88 and 83 are surrogate replication queues in the respective surrogate nodes.

The nodes on LAN site 2 are configured according to the configuration at site 1. Namely, node D may receive messages from the main node B or its surrogate C. Node D may also receive messages from its surrogate, node E. This is shown by OR location 94.

Similarly, the multi-cast surrogate queue 88 in node C is configured to deliver messages from its source location 48 which includes now sublocation 1B, to the destination AND-OR location 85 having sublocation 2A, a local subscriber L, and OR location 93 as constituents. The OR location 93 comprises sublocations 2D and its surrogate, location 2E.

It is to be noted that FIG. 8 shows the delivery of messages from locations-2 84, or 85 in a simplified form. Namely, the locations are shown as being directly connected to the respective sockets a, d, e and c for node B and sockets a, d and e for node C, without explicitly showing the connections with the respective external I/O process 37. The posting of the messages from the queues to the sockets via the conceptual locations 84 and 85, is done by the external I/O processes 37 and this is intuitively shown by arrows 84' and 84".

Nonetheless, in order to avoid duplicate transmissions from both nodes B and C, external I/O process 37 at node C is configured to pull out the messages from queue 88 and send them to the destination queues 80 and (89 or 83) only when node B is dead. Otherwise, the remote destination locations 2A and (2B or 2E), i.e. their proxies, are blocked in the surrogate node C in order to prevent unnecessary communication of messages, as long as node B is alive. Node C continually monitors the status of node B and activates the pre-configured sublocations as soon as the primary source of replication dies. As mentioned before, sublocations 2D and 2E at node C, are open only when node B is down, or reviving. These locations are again blocked when the primary source replication node B is again live and connected, and the normal state is restored.

It is not required to replicate the messages received from publisher process 51, or its surrogate, to both transit queues 89, 83. It is enough to send the messages to only one active replicator, i.e. the main transit queue 89, if alive, and delegate the responsibility of copying the messages to its surrogate. Usually, the main transit queue 89 is considered the active replicator.

As explained before, node D is a transit node, or a pre-configured secondary source of replication in this example. Node E is configured as a surrogate transit node. The configurations of the transit node D, and of its surrogate transit node E, are similar except for some differences at the input end of the main queues 89 and 83. Thus, the input end of the transit queue 89 in node D is configured to be an OR location 94 with sublocations 1E, 1B and 1C as constituents. This implies that only one stream of messages received from either node B, C or E, is directed into queue 89. "AND location" 86 is configured to contain a local subscriber L, and sublocations 2E and 2F as constituents.

In Node E, the "OR location" 95 at the input end of the composite queue 89 is configured to contain sublocations 1B, 1C and 1D, only one of which being active at a certain time. The "AND location" 87 at the output end of queue 83 is configured to contain a local subscriber L, and sublocations 2D and 2F as constituents. Sublocations 2D and 2F are to be blocked at all time under normal operation mode (i.e. when node D is alive), and are opened through communication lines 97 and 99, only when the main transit node D is dead or recovering. By providing messages through sockets 99, 100, for the destination sublocations 2D, 2F, queue 83 becomes available to take up the role of a surrogate transit queue. The surrogate status of node E will remain active until node D completely recovers by getting all backlog of messages missed during failure and until the normal state ("live and connected") is restored. These messages are available from node E located at the same site 2.

A simpler protocol for synchronization can be used if the input end of the main transit queue 89 into which messages are being written is configured as a compound location containing source sublocations corresponding to the nodes from which the messages are sent. For example, the compound "OR-location" 94 in D could be configured to contain sublocation 1B, and the compound "OR-location" 95 in E could be configured to contain sublocation 1D. This helps the output end of the main transit queue 89 to route an error message back to the source, either the primary or the secondary. If node D determines, before writing a message into the queue 89, that a wrong message due for example to sequencing, was received from node B, an error message is sent back to node B by inter-changing the source and the destination location identifications (IDs) of the original message. On the other hand, if the error happens during communication between D and (E or F), the error will be sent back to D. Nodes B and D contain a mechanism to rectify the problem or sound an alarm.

The configuration of the queue 98 in node F is designed to capture messages from "OR location" 96 having (1D and 1E) as constituents. This means that node F may receive messages from either one of main transit node D or its surrogate node E.

As mentioned before, more nodes in the network could be designated as sources of replication. In the case of Advanced Intelligent Networks (AIN), the time order of the NSUs generated at any particular source can be preserved at the destination end by using known connection-oriented propagation methods. Conflict resolution methods are used for maintaining the time-ordering when NSUs generated at different sources arrive at the destination ends not necessarily in the same time order. They produce the same effect on different databases irrespective of how messages from different sources are picked up at different destination ends, as long as all the messages are available and despatched. Thus, it is possible to treat a multiple-source replication process as multiple independent single-source replication process, and use the AND-OR replication method described above.

Figure 9:
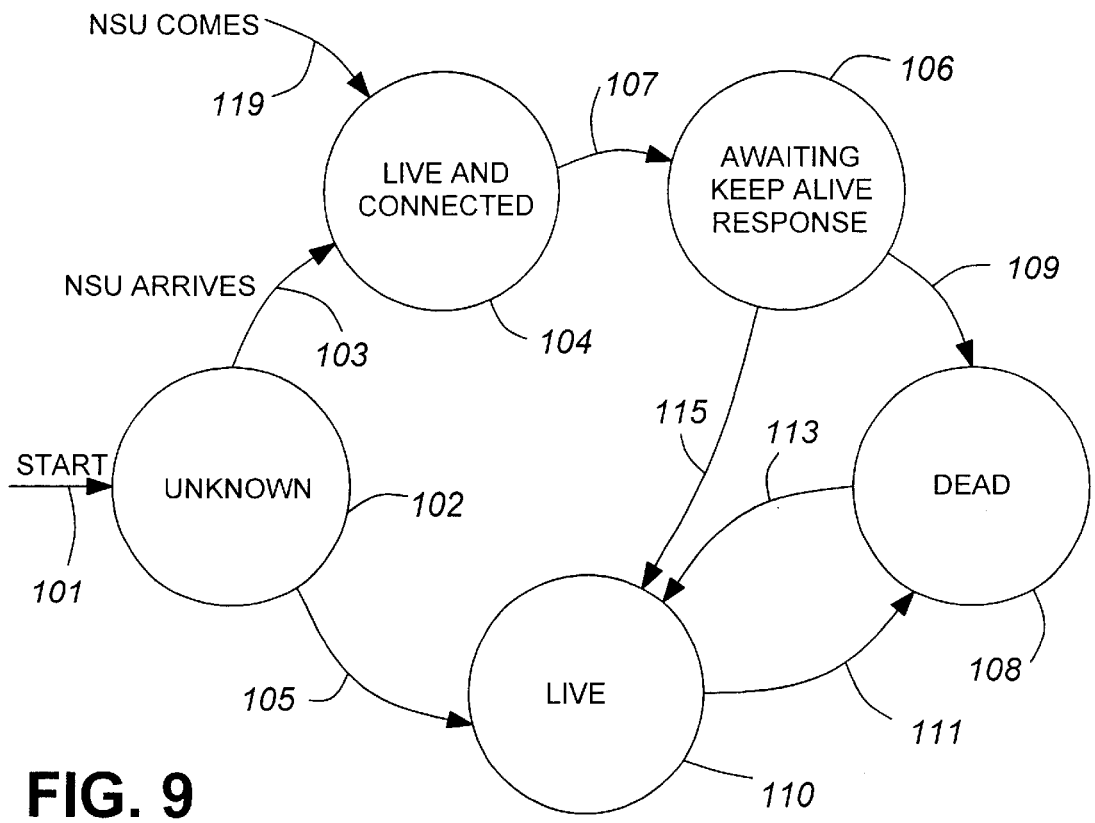
FIG. 9 is a graph illustrating a finite state model for sensing liveness/death of a node in a network.

A finite state model for sensing the death/revival of a node is shown in FIG. 9. The assumption is that the node is in an unknown state (102) when the process starts (101). Later in the process, the assessment of the state of the node changes depending upon the available indications from the activities of that node. These indications are available to peer nodes and are based on direct knowledge of this particular node activity, or indirect knowledge collected from the same site transit nodes.

Direct knowledge of a state of a node is obtained from the regular arrival of NSUs from this node (shown at 103), when the state of this node is unknown. Even if NSU's come from this node, when it is assessed to be in any other state, shown at 119, a state change occurs. If the node appears to be active, due to a direct evidence, its state is termed "live and connected" as shown by shown at 104.

In the case when there is a long interruption and no NSU activity is not detected for a predetermined period from this node, its death is suspected. The assessing node sends a KeepAlive request message, shown at 107 and waits for a response. During this period, shown at 106, the state of this node is said to be "awaiting KeepAlive response". If the response from that node times out, shown at 109, the death of the suspected node is confirmed, shown at 108. On the other hand, if the response comes within a preset amount of time, shown at 115, the node is considered in "live" state, shown at 110.

When the death of a node is confirmed, shown at 108, the node that sensed the death becomes responsible for informing its site-peers about the death, shown at 111. The other nodes get indirect evidence about the death of that node even if they are not directly connected to that node.

In the case of a single source, as well as in the case of a multiple-source replication process, each node is connected to at least one node at any other sites and therefore, nodes from the other sites will also be able to get a direct indication about the death of a node due to the interruption of its messaging activity.

The process of sensing the revival of a node is similar. A node getting confirmation about the revival of another node based on resumption of messaging activity from this reviving node, communicates this information, shown at 113, to its site-peers. As well, indirect information from other nodes may be used for sensing the change of the "unknown" state of the node to "live", shown at 105.

A node which fails and comes up, would miss some messages transmitted during the failure period. A reviving node may place a request to the source node to send the missing messages starting with the next expected message which is always known. This implies that all the messages should be available at the source node either in memory, or on persistence store component of the originating queues. In addition, the source node should be equipped with rewind and replay capabilities to re-send the missing messages. These re-transmission capabilities according to the present invention, are in fact methods for repositioning the read cursors RC1–n of the multi-cast queue 35.

Advantageously, replication by a relay process according to the invention, distributes the computational burden for multi-casting over a number of nodes since the original source need not replicate to all the nodes in the network. Also as indicated before, due to the fact that the failure effects are localized at one LAN site, a revived node can procure the messages missed during the failure period from a secondary replication node located at the same LAN site, i.e. a transit queue located at the same LAN site.

The present invention provides a user-configurable routing method which can be put into effective use in any network of arbitrary topology by an adequate choice of the transit nodes. Transit nodes may be selected using simple criteria, like distribution of congested traffic to less congested, or faster links.

The method is also applicable to any general network topology, for arbitrary cascading of the replication nodes, and can be implemented by mere configuration of locations and multi-cast queues. For example, a main replication node may be configured to replicate to some nodes, a secondary replication node to replicate to some more nodes, and so on.

In the case where every node is potentially a replicator, a circular master-surrogate relationship among the nodes at any site may be used. This means that for a 2-surrogate solution as in the example of FIG. 8, at the site comprising three nodes A, B, and C, nodes B and C become first and second surrogates, respectively, for messages propagated from node A. Similarly, C and A become the first and second surrogates for node B for messages propagated from node B. The node in charge may be chosen using simple algorithms i.e. the live surrogate with least index.

The difference between the queues that act as surrogates of the original queues, and the queues that cater only to the ultimate destinations (end queues), is in the number of subscribers not in the number of messages they receive. Therefore, switching between the surrogate and non-surrogate status is done simply by changing the queue configurations.

Addition and removal of new replication nodes/sites, are performed according to the invention by configuration changes, e.g. changing the queue and the location configurations to take care of the new nodes. Addition is done by breaking the links in the original circular relationship and building a new circular master-surrogate relationship with the new nodes. This is obtained by reconfigurating the input end and the output end of the existing queues.

For example, if a node G is to be introduced next to nodes A, B, C, at LAN site 1, the new relationships will be as follows: C and A will be surrogates of B; B and C will be surrogates of the new node G; G and B will be surrogates of A; and A and G will be surrogates of C.

A similar kind of relationship is maintained with respect to the transit nodes at the other sites. For a node at one site, the node at a location having the same numerical index at the other site is the main transit node, while the subsequent nodes are surrogate transit nodes. The addition or deletion of these nodes implies changing the relationships and dynamically reconfiguring the queues and locations to reflect these changes. The new nodes/sites are brought into the replication framework with the help of a dynamic configuration management procedure. Basically, the replication paths to new nodes/sites can be set by adding the desired locations at the new nodes. This may be implemented by using the AND-OR locations, by adding new read cursors on to the multi-cast queues, and by re-configuring the multi-cast queues at the new sites.

Numerous modifications, variations, and adaptations may be made to the particular embodiments of the invention without departing from the scope of the invention which is defined in the claims.

What is claimed is:

1. A routing method for asynchronous propagation of messages between a source location and primary and secondary replication nodes in an advanced intelligent network, comprising the steps of:

establishing connections between a primary replication node located at a first LAN site and all peer nodes at said first LAN site;

selecting a node from a plurality of nodes, each node being configurable as a transit node, at a second LAN site in accordance with at least one criterion associated with said advanced intelligent network, creating said transit node at said selected node, and establishing a single connection between said primary replication node and said transit node so as to form a secondary replication node at said second LAN site;

establishing connections between said transit node and all peer nodes located at said second LAN site.

2. A routine method for asynchronous propagation of messages between a source location and primary and secondary replication nodes in an advanced intelligent network, comprising the steps of:

establishing connections between a primary replication node located at a first LAN site and all peer nodes at said first LAN site;

selecting a node from a plurality of nodes at a second LAN site, creating a transit node at said selected node and establishing a connection between said primary replication node and said transit node so as to form a secondary replication node at said second LAN site;

establishing connections between said secondary replication node and all peer nodes located at said second LAN site; and creating a surrogate node associated with at least one of said primary and secondary replication nodes at a LAN of said associated replication node, said surrogate node having a functionality of said associated replication node, and the functionality of said surrogate node being activated when said associated replication node becomes inactive.

3. The routing method of claim 2, wherein said step of establishing connections includes implementing a multi-cast queue for each said replication node, said multi-cast queue having a plurality of source sublocations configured at an input end for receiving said messages, and a plurality of destination sublocations configured at an output end for routing messages between said primary and secondary replication nodes.

4. The routing method of claim 3, wherein a multi-cast master queue is implemented for each said primary replication node.

5. The routing method of claim 4, wherein said step of creating a transit node includes dynamically configuring said source and said destination sublocations and implementing a multi-cast transit queue located in said transit node as a replica of said multi-cast master queue.

6. The routing method of claim 5, wherein said step of creating a surrogate node includes dynamically configuring said source and said destination sublocations and implementing a multi cast surrogate queue located in said surrogate node as a replica of said multi-cast transit queue.

7. The routing method of claim 3, further comprising the step of dynamically configuring said destination locations and said source locations for removing a node or for adding new nodes and bringing them into the replication framework.

8. The routing method of claim 3, further comprising the step of dynamically configuring said destination sublocations and said source sublocations for sending error messages back to the originating node.

9. The routing method of claim 3, wherein said messages are routed to all the nodes in said network according to said plurality of destination sublocations configured at said output end of said multi-cast queue.

10. The routing method of claim 3, wherein said messages are routed to only one live node of said plurality of destination locations configured at said output end of said multicast queue.

11. The routing method of claim 6, further comprising continuously monitoring the activity of said replication nodes by said surrogate nodes and whenever a replication node is dead:

informing peer nodes accordingly, activating said source and destination sublocations of said surrogate node, and allowing said primary replication node to dynamically switch connection from said dead node to said surrogate node.

12. The routing method of claim 6, further comprising continuously monitoring the activity of said replication nodes by said surrogate nodes and whenever a replication node is revived:

informing peer nodes accordingly, resuming the replication activity of said surrogate node, allowing said main replication node to dynamically switch connection from said surrogate node to said revived node, and recovering messages lost during the failure period from nodes located at the same LAN site with said revived node.

13. The routing method of claim 1, for a multiple source replication process.

14. The routing method of claim 3, wherein said multi-cast queue uses a random access memory.

15. The routing methods of claim 3, wherein said multi-cast queue uses shared memory and disk space.

16. The routing method of claim 3, wherein said multi-cast queue uses shared memory and a network file server.

17. A routing method for asynchronous propagation of messages between a source location and primary and secondary replication nodes in an advanced intelligent network, comprising the steps of:
    establishing connections between a primary replication node located at a first LAN site and all peer nodes at said first LAN site;
    creating a transit node located at a second LAN site and establishing a connection between said primary replication node and said transit node so as to form a secondary replication node at said second LAN site;
    establishing connections between said transit node and all peer nodes located at said second LAN site; and
    creating a surrogate node associated with each of said primary and secondary replication nodes,
    said step of establishing connections includes implementing a multi-cast queue for each said replication node, said multi-cast queue having a plurality of source sublocations configured at an input end for receiving said messages, and a plurality of destination sublocations configured at an output end for routing messages between said primary and secondary replication nodes,
    a multi-cast master queue being implemented for each said primary replication node,
    said step of creating a transit node includes dynamically configuring said source and said destination sublocations and implementing a multi-cast transit queue located in said transit node as a replica of said multi-cast master queue.

18. The routing method of claim 17, wherein said step of creating a surrogate node includes dynamically configuring said source and said destination sublocations and implementing a multi-cast surrogate queue located in said surrogate node as a replica of said multi-cast transit queue.

19. A routing method for asynchronous propagation of messages between a source location and primary and secondary replication nodes in an advanced intelligent network, comprising the steps of:
    establishing connections between a primary replication node located at a first LAN site and all peer nodes at said first LAN site;
    creating a transit node located at a second LAN site and establishing a connection between said primary replication node and said transit node so as to form a secondary replication node at said second LAN site;
    establishing connections between said transit node and all peer nodes located at said second LAN site; and
    creating a surrogate node associated with each of said primary and secondary replication nodes,
    said step of establishing connections includes implementing a multi-cast queue for each said replication node, said multi-cast queue having a plurality of source sublocations configured at an input end for receiving said messages, and a plurality of destination sublocations configured at an output end for routing messages between said primary and secondary replication nodes,
    the method further comprising the step of dynamically configuring said destination locations and source locations for removing a node or for adding new nodes and bringing them into the replication framework.

20. A routing method for asynchronous propagation of messages between a source location and primary and secondary replication nodes in an advanced intelligent network, comprising the steps of:
    establishing connections between a primary replication node located at a first LAN site and all peer nodes at said first LAN site;
    creating a transit node located at a second LAN site and establishing a connection between said primary replication node and said transit node so as to form a secondary replication node at said second LAN site;
    establishing connections between said transit node and all peer nodes located at said second LAN site; and
    creating a surrogate node associated with each of said primary and secondary replication nodes,
    said step of establishing connections includes implementing a multi-cast queue for each said replication node, said multi-cast queue having a plurality of source sublocations configured at an input end for receiving said messages, and a plurality of destination sublocations configured at an output end for routing messages between said primary and secondary replication nodes,
    the method further comprising the step of dynamically configuring said destination sublocations and said source sublocations for sending error messages back to the originating node.

21. The routing method of claim 18, further comprising continuously monitoring the activity of said replication nodes by said surrogate nodes and whenever a replication node is dead:
    informing peer nodes accordingly,
    activating said source and destination sublocations of said surrogate node, and
    allowing said primary replication node to dynamically switch connection from said dead node to said surrogate node.

22. The routing method of claim 18, further comprising continuously monitoring the activity of said replication nodes by said surrogate nodes and whenever a replication node is revived:
    informing peer nodes accordingly,
    resuming the replication activity of said surrogate node,
    allowing said main replication node to dynamically switch connection from said surrogate node to said revived node, and
    recovering messages lost during the failure period from nodes located at the same LAN site with said revived node.

23. The routine method of claim 1, wherein said advanced intelligent network has a Wide Area Network (WAN) and a plurality of LAN sites including said first and second LAN sites, which are connected to each other through said WAN, an wherein said selecting step selects said node so as to reduce traffic congestion in said WAN.

24. The routing method of claim 1, wherein said selecting step selects said node so as to achieve fast link in said advanced intelligence network.

25. The routing method of claim 1, wherein said advanced intelligent network has a Wide Area Network (WAN) and a plurality of LAN sites including said first and second LAN sites, which are connected to each other through said WAN, and wherein said selecting step selects said node with respect to a bandwidth utilization of said WAN.

26. The routing method of claim 1, wherein said step of establishing connections includes implementing a multi-cast queue for each said replication node, said multi-cast queue of said primary replication node having a plurality of destination sublocations, one of said destination sublocations being associated with said transit node and the other being associated with said peer nodes at said first LAN site.

27. The routing method of claim 26, further comprising the step of dynamically configuring said replication nodes and said multi-cast queue for removing a node or for adding one or more new nodes and bringing them into the replication framework.

28. The routing method of claim 26, wherein said multi-cast queue uses a random access memory.

29. The routing method of claim 26, wherein said multi-cast queue uses shared memory and disk space.

30. The routing method of claim 26, wherein said multi-cast queue uses shared memory and a network file server.

* * * * *